Feb. 5, 1924.
F. STEBLER
SIZING APPARATUS
Filed Sept. 25, 1923
1,482,824
2 Sheets-Sheet 1
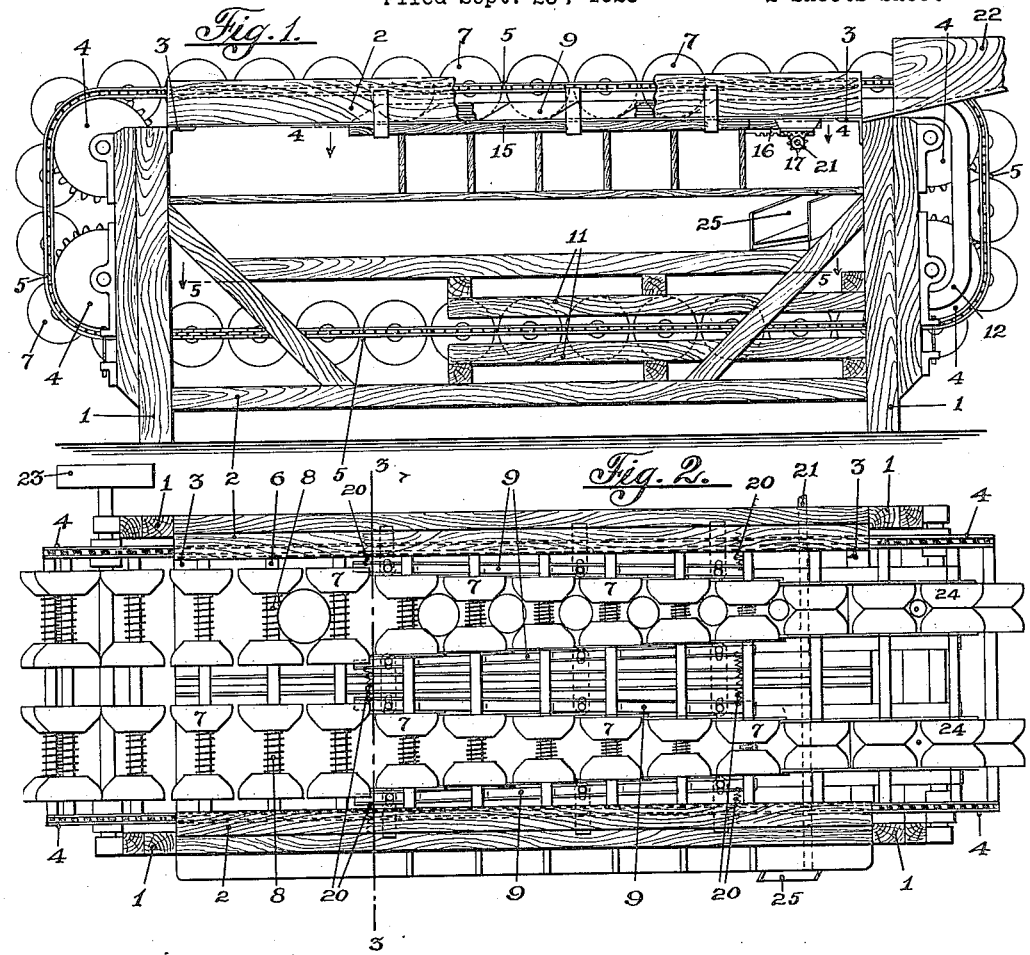
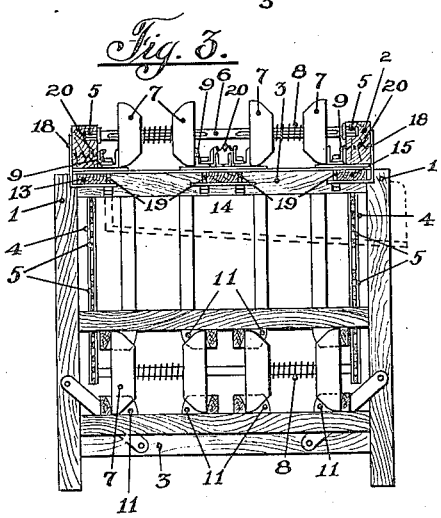
Inventor.
By Fred Stebler
Attys.

Feb. 5, 1924. 1,482,824
F. STEBLER
SIZING APPARATUS
Filed Sept. 25, 1923 2 Sheets-Sheet 2
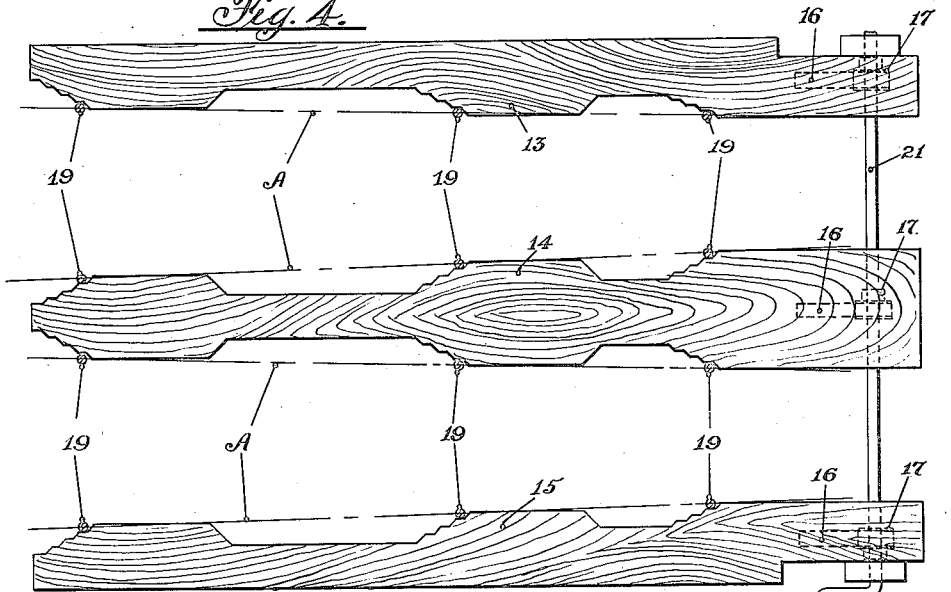
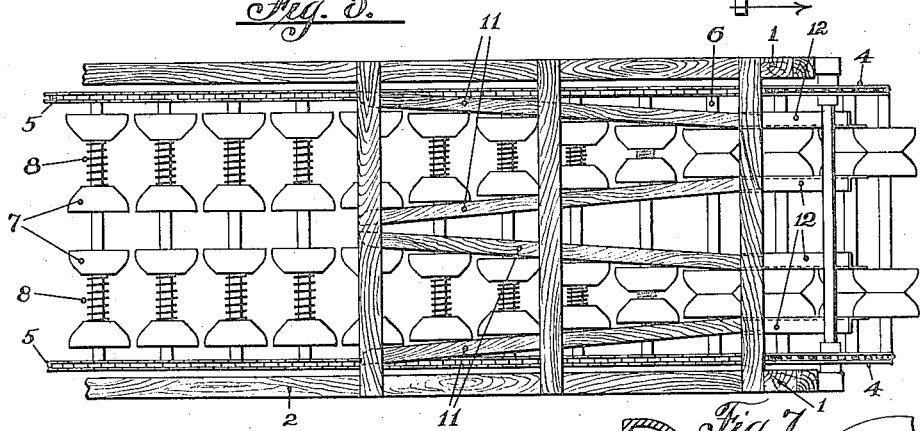
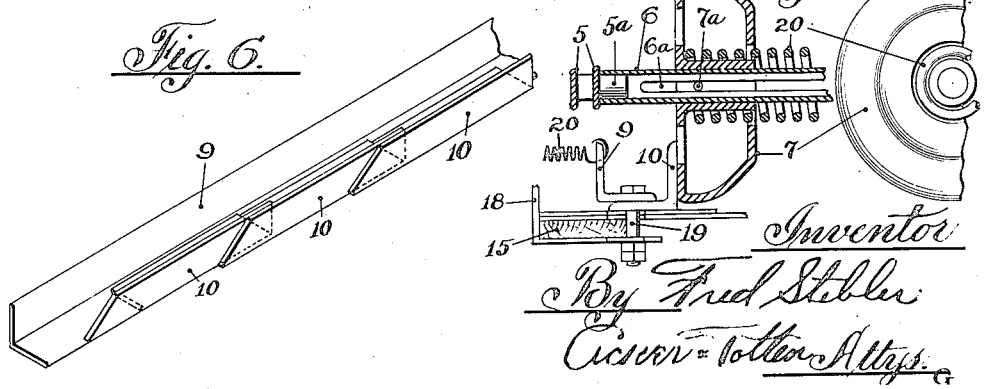

Patented Feb. 5, 1924.

1,482,824

UNITED STATES PATENT OFFICE.

FRED STEBLER, OF RIVERSIDE, CALIFORNIA, ASSIGNOR TO STEBLER PARKER CO., OF RIVERSIDE, CALIFORNIA, A CORPORATION OF CALIFORNIA.

SIZING APPARATUS.

Application filed September 25, 1923. Serial No. 664,696.

*To all whom it may concern:*

Be it known that I, FRED STEBLER, a citizen of the United States, residing at Riverside, in the county of Riverside and State of California, have invented certain new and useful Improvements in Sizing Apparatus, of which the following is a specification.

This invention relates to an apparatus for sizing and segregating articles and is particularly adapted to sizing and separating apples in packing houses or orchards where the fruit is graded and sized according to circumferential and diametrical dimensions.

In the sizing and grading of fruit of this type it is desirable that each individual fruit is handled separately and by means that will ensure a large daily output; that will in no manner bruise or damage the fruit; that will segregate each size as separated and drop them in suitable bins or boxes or on conveying belts or tables as may be desired; that will operate continuously and at a high rate of speed and accuracy and which will be capable of instant and rapid adjustment to change the grading at the different points of discharge, or to accommodate any other conditions attending the sizing and grading of any particular lot of fruit.

A principal object of the invention is to provide a machine for this purpose that is of simple and easily understandable construction and adjustment so that it can be handled and manipulated by unskilled labor; that will have a plurality of sizing and grading elements traveling in unison and opposed relation and being held in operative position by yielding means and that will be capable of placement in a line of conveying machinery and act as an independent unit in its operations of sizing and grading the fruit passing therethrough.

Another object of the invention resides in providing an adjustable means to the grading elements whereby instant adjustment may be given to a complete set of operating units while the machine is in motion and operation, thus enabling a precision in the grading operation of articles of this class and type that has not been previously attained; this manner of adjustment being permitted through the medium of the yielding means above referred to.

In carrying out the objects of my invention in a concrete form of machine, further objects and improvements have been evolved than have been recited, and in order to make the invention more clearly understood there are shown, somewhat diagrammatically, in the accompanying drawings means and mechanism embodying the preferred structural arrangement and the preferred disposition of the different parts and combinations, without limiting the claims to the details of construction shown, in which I have simply illustrated one way of embodying the creative part or conception of the invention in a concrete form of machine. The described devices are simply embodiments of the invention which other structures might also employ and some of the parts or combinations of parts may be used without the others in different types of such machines without departure from the purview of my invention and I regard myself as entitled to such variations from the shown and described devices as fall within the scope and meaning of the claims hereto appended.

In the drawings accompanying this specification, I have endeavored to illustrate my invention in a manner to be most easily understood and have therefore departed somewhat from strict methods of engineering practice in the construction of machines of this type, all of the views of the drawings are more or less diagrammatic in their showing and are to be thus understood in studying the invention.

In the drawings forming a part of this application:

Fig. 1 represents a side elevation of a machine embodying my invention with some parts broken away to more clearly illustrate the underlying parts or mechanism.

Fig. 2 is a plan of Fig. 1 and represents the parts and elements in approximately the same general positions as they are in Fig. 1, but omitting from this view much of the structure underlying the upper elements, so that the said upper elements will not be buried in a mass of dotted lines and under structure that can be better illustrated separately.

Fig. 3 is a vertical cross sectional elevation taken on approximately line 3—3 of Fig. 2 showing only the parts of the machine lying in the immediate plane of section with the exception of parts of the framework and conveying means.

Fig. 4 is a diagrammatic plan of the instantaneous adjusting means for the sizing elements and is taken on approximately the line 4—4 of Fig. 1 looking down on the adjusting members with all other elements of the machine omitted except the studs that bear against and are moved by the adjusting wedges, the said studs being fixedly connected with the stop bars that control the positions of the sizing elements.

Fig. 5 is a sectional plan taken on approximately the line 5—5 of Fig. 1 and illustrating the diverging guide members that automatically bring the sizing elements back into a position of minimum adjustment.

Fig. 6 is an isometric projection of one of the stop bars and shows approximately the manner of constructing the sectional bars to permit of a graduated intermittent adjustment of the sizing elements as the said elements are moving continuously in a forward direction.

Fig. 7 is a vertical section and a face plan of one of the sizing elements enlarged to more clearly show its structure and arrangement on the carrying spindle, and the manner in which the yielding means holds it to its operative position. This view also shows an enlarged detail of an adjusting wedge and stud controlling a stop bar.

In the drawings like figures of reference indicate like parts in the several views.

The operative mechanism is supported by means of a framework comprising the upright members 1, longitudinal members 2 and cross members 3 all united to form a rectangular framework.

Mounted on either end of the framework in suitable bearings are sprockets 4 carrying the endless conveyor chains 5. At regularly spaced intervals on said chains 5 are located transverse spindles 6, rotatably mounted on said chains by means of special links having pivot extensions on which the spindles ride. Located on each of said spindles 6 are a plurality of opposed sizing members 7 held in spaced relation by means of the springs 8, the said springs always tending to hold the pairs of opposed sizing members in open adjustment. Located longitudinally of the path of travel of the chains carrying the multiplicity of sizing members 7 are yieldably held stop bars 9 so located that the outer surfaces of the sizing members 7 are held in riding contact as they pass forward through the machine. On each of these stop bars 9 are located stepped and overlapped members 10, see Fig. 6, these members 10 are securely fastened to the bars 9 and move therewith whenever the said bars are adjusted. These members 10 constitute a stepped path of travel for the sizing members and automatically give them a graduated intermittent adjustment axially as they are conveyed through the machine, so that while the sizing members are in positions of minimum adjustment when they first start their advance across the sizing zone of the machine, by means of the stepped relation of the members 10 they are gradually brought into positions of maximum axial adjustment, all of the positions intervening between the minimum and maximum adjustment of the sizing members serving to select the various sizes of fruit and permit them to drop into the box or bin provided for that particular size.

After the sizing members 7 have reached their maximum adjustment and passed over the end of the machine they must be returned to positions of minimum adjustment so as to repeat their operations when they again start their advance over the sizing zone. This resetting of the sizing members is accomplished through the diverging members 11, best shown in Figs. 3 and 5. A subframe is built in the base of the main frame on which these members 11 are mounted in the manner clearly shown in these views. Fig. 5 particularly shows just how the members 7 are gradually brought into positions of minimum adjustment. After having been placed in minimum adjustment by means of the members 11 they are held in this position by means of the angles 12 extending from the ends of the diverging members 11 up around the end of the machine to the entering ends of the stop bars 9. The springs 8 serving to constantly hold the sizing members 7 against the bars and members constituting the path through which the parts move.

The following mechanism is provided to afford a quick and accurate means of adjusting the sizing openings formed by the opposed positions of the sizing members 7. Located directly under the plane of travel of the sizing members 7 across the top surface of the machine are what I term three sizing wedges indicated by the numerals 13, 14 and 15, shown in approximately their proper operative positions in Fig. 4 as they appear in plan, in Fig. 3 as they appear in end section and in Fig. 1 as they appear in side elevation. These wedges are mounted for longitudinal reciprocation by means of the manually operated racks and pinions 16 and 17, and are confined in their movement by means of the retaining brackets 18 and the studs 19, shown most clearly in Fig. 3. The stop bars 9 carry the studs 19 and the springs 20 hold the studs tightly against the wedges 15. The brackets 18 are slotted where the studs pass through to permit of lateral movement of the studs when the wedges 15 are moved. The adjusting pinions 17 are mounted on a cross shaft 21 provided with a crank end to permit of easy manipulation. In Fig. 4 the section lines A indicate the diverging path of travel of the sizing members 7 determined through the positions of the studs 19 in relation to the notches on the wedges against which they are held by the springs 20. If the crank end of the shaft 21 is turned in the direction of the arrow B, the wedges will be moved in the direction of the arrow C with the result that the studs 19 will drop into the next lower notches on the edges of the wedges and thus permit the stop bars to separate and thus increase the size of the openings formed by the sizing members 7. This manner of adjustment is instantaneous and acts on all of the sizing members in contact with the stop bars 9 and 10 at the same time. The retaining nuts on the studs 19 may be left just friction tight so that the adjustments may be accomplished while the machine is in motion if desired.

While I have shown the edges of the adjusting wedges as notched this construction is not always necessary. A straight inclined surface would act as well as a notched edge and would, where it is desirable, give a finer and more graduated adjustment to the sizing openings.

Where the sizing members 7 are shown in minimum adjustment their inner faces are in practical contact so that some provision must be made for the springs 8 to function. This is accomplished through the structure illustrated in Fig. 7. Here it will be observed that the inner face of the sizing roller 7 is recessed so that the spring 20 can enter into the roller, over the hub and thus have compression space when the rollers 7 are in close adjustment. This view also illustrates the manner of stopping the rollers 7 in the maximum adjustment. The spindle 6 is hollow and is slotted at 6ª, a pin 7ª secured to the roller 7 comes against the end of the slot under the expanding action of the spring 20 and is thus held in maximum open adjustment. This view also shows the pivot connection carried by the chain 5 and is indicated at 5ª.

Having thus described the details of structure, I will now proceed with a description of the operation of the machine.

In packing houses where a machine of this type would be used the machine will be placed in a conveying system of whatever sort is in vogue in that particular place. The apples to be sorted are promiscuously placed in the hopper or chute 22 and as they roll down into contact with the moving rollers 7, movement being provided through the power means, not shown actuating the pulley 23, they will naturally roll into the spaces formed by four of the opposed sizing rollers indicated in Fig. 2 by the numeral 24. At the place of entry the sizing rollers are in minimum adjustment so that the smallest openings are first presented to the apples. If an apple is small enough to pass through these smallest openings it will drop into the chute 25 and be conveyed to some receptacle provided or conveyed to any place desired about the plant. If however the apple is too large to pass through these first sizing openings, it will be carried along by the sizing members on which it is resting until such time comes that an opening is reached by the intermittent opening of the sizing members when it will fall through into some one of the bins or chutes placed underneath each zone of different openings and thus all of a given size will be segregated and sorted according to the requirements of the plant. The circles in the gradually enlarging openings in Fig. 2 represent apples of varying sizes, or any fruit or articles of globular contour that it is desired to size and sort. It will be observed that the sizing openings formed by the rollers 7 are of a square inclination, this shape opening seems desirable for the proper sizing of apples, some other shape opening might be most desirable for sorting other classes of articles. The conveyor chains 5 ride through slots in the top frame members 2 and this holds the spindles 6 and sizing rollers 7 in proper operative alignment as they move through the machine.

What I claim as new and desire to secure by Letters Patent of the United States is:—

1. A machine for sizing and grading articles comprising endless conveyors carrying a multiplicity of sizing elements, yielding means for holding said sizing elements in operative relation and adjustable guiding means for said sizing elements in frictional contact with which said elements are maintained by said yielding means.

2. A machine for sizing and grading articles comprising a series of oppositely disposed sizing elements, yielding means located between pairs of said elements whereby said sizing elements are held in operative relation, guiding means for each series of sizing elements, and means for simultaneously adjusting all of said guiding means.

3. A machine for sizing and grading articles comprising a series of spring controlled sizing members, guide members for determining the operative positions of said sizing members, with means for adjusting the operative positions of said guide members.

4. A machine for sizing and grading articles comprising a series of sizing members, yielding means for holding said sizing members in operative relation, guide members for controlling the operative positions of said sizing members and manually manipulative means for positioning said guide members in relation to said sizing members.

5. A machine for sizing globular articles comprising a plurality of oppositely disposed sizing elements, yielding means holding said sizing elements in operative relation, guide means for gradually changing the operative relations of said sizing members and manually manipulative means for adjusting the positions of said guide means to vary the operative positions of said sizing members.

6. A machine for sizing and grading articles comprising a plurality of pairs of sizing elements moving successively through predetermined paths, yielding means for holding said sizing elements in operative positions, guide means permitting a gradual automatic adjustment of said sizing elements, and manually manipulative means for changing the locations of said guide means.

7. In a machine for sizing and grading fruit comprising a plurality of pairs of sizing elements moving in series relation and positioned to form sizing openings with the elements of each pair movable to and from each other, means between the elements of each pair for maintaining said sizing elements in operative relation, a plurality of guide means for determining the paths of travel of said sizing members and means for simultaneously adjusting the relative positions of said guide means to vary the paths of travel of said sizing elements.

8. In a machine for sizing and grading fruit comprising a plurality of pairs of sizing elements moving in series relation and positioned to form sizing openings, yielding means for maintaining said sizing elements in operative relation, a plurality of guide means for determining the paths of travel of said sizing members and means for simultaneously adjusting the positions of said guide means to vary the paths of travel of said sizing elements.

9. In a machine for sizing and grading fruit comprising a series of oppositely disposed sizing elements, spring means for maintaining said sizing elements in operative relation, spring held guide means for determining the paths of travel of said sizing elements, reciprocating members for simultaneously changing the positions of said guide means to vary the paths of travel of said sizing elements.

10. In a machine for sizing fruit comprising a plurality of sizing elements, spindles on which said sizing elements are mounted, springs for moving said sizing elements axially along said spindles, guide means for regulating the paths of travel of said sizing elements and means for changing the positions of said guide members to vary the paths of travel of said sizing members.

11. In a machine for sizing and grading fruit comprising a plurality of pairs of sizing elements, diverging guide means against which said pairs of sizing elements ride, yielding means for holding said pairs of sizing elements in riding contact with said guide means whereby as said sizing elements move through their paths the sizing openings formed by their relative positions are gradually enlarged to permit fruits of varying sizes to pass therethrough.

In testimony whereof I have signed my name to this specification.

FRED STEBLER.